US012731073B2

United States Patent
(12) United States Patent
Lee et al.

(10) Patent No.: US 12,731,073 B2
(45) Date of Patent: Sep. 8, 2026

(54) SEMICONDUCTOR DEVICE

(71) Applicant: Samsung Electronics Co., Ltd., Suwon-si (KR)

(72) Inventors: Kiwon Lee, Suwon-si (KR); Sung-Rae Kim, Suwon-si (KR); Gilyoung Kang, Suwon-si (KR); Hye-Ran Kim, Suwon-si (KR); Chisung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 18/054,176

(22) Filed: Nov. 10, 2022

(65) Prior Publication Data

US 2024/0005204 A1 Jan. 4, 2024

(30) Foreign Application Priority Data

Jun. 29, 2022 (KR) ........................ 10-2022-0079970

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 4,486,739 A * 12/1984 Franaszek ............. H03M 5/145 341/59
7,929,549 B1 4/2011 Talbot
8,161,331 B2 4/2012 Bae et al.
8,725,976 B2 * 5/2014 Cho ....................... G06N 20/00 714/719
8,745,465 B1 6/2014 Aligave et al.
9,042,427 B2 5/2015 Singh et al.
9,747,076 B1 8/2017 Yang et al.
10,237,098 B2 3/2019 Kossel
10,725,682 B2 7/2020 Kim et al.
2013/0055039 A1 2/2013 Dearth
2020/0326865 A1 10/2020 Kim et al.
2022/0014469 A1 1/2022 Ota et al.
2024/0223924 A1 * 7/2024 Lee .................... H04Q 11/0005

FOREIGN PATENT DOCUMENTS

EP 1862776 B1 * 10/2012 ....... H04L 25/03019
KR 100879560 B1 1/2009
KR 10-2019-0069774 A 6/2019

* cited by examiner

*Primary Examiner* — Guerrier Merant

(57) ABSTRACT

A semiconductor device includes a sequence data generator, which is configured to generate sequence data on a plurality of data lines, and a symbol changer. The symbol changer is configured to generate a training pattern from the sequence data by replacing, for each of the plurality of data lines, each occurrence of a bitstream within the sequence data that has a predetermined symbol with an alternative symbol. The sequence data generator may include a sequence generator, which is configured to generate a pseudo random binary sequence (PRBS), based on a seed value for each clock cycle.

19 Claims, 10 Drawing Sheets

200
Control Logic
Command Decoder
Mode Register
220
221
222
CMD
SV
OV
Address Buffer
230
ADDR
RA
BA
CA
RA MUX
251
Bank Control Logic
240
Row Decoder
250
250a
250h
Bank 0
Bank h
210
210a
210h
MC
BL
WL
Sense Amplifier
211
211a
211h
I/O Gating
270
Column Decoder
260
260a
260h
Clock Control Circuit
272
WCK
CK
ICK
Data I/O Circuit
290
Receiver
Driver
Training module
FIFO
291
292
293
294
P0
Pn-1
Pn
DQ0
DQn-1
DQS
TP
Pattern Generator
Symbol changer
Sequence Data Generator
280
281
282

FIG. 6

1st burst

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | | | | | | | 601a | | | | 601b | | | | | | | | 601c | | | | | | | | | | | | | |
| INPUT (32bits) | 0 | 1 | 1 | 1 | 0 | 1 | 1 | 0 | 0 | 1 | 1 | 0 | 0 | 1 | 1 | 1 | 0 | 1 | 1 | 0 | 0 | 1 | 1 | 1 | 0 | 1 | 1 | 1 | 0 | 1 | 1 | 1 |
| SEL | L | | L | | L | | H | | L | | H | | L | | L | | L | | H | | L | | L | | L | | L | | L | | L | |
| OUTPUT (32bits) | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 |

2nd burst

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | | | 602a | | | | | | | | | | | | 602b | | | | 602c | | | | 602d | | | | | | 602e | | | |
| INPUT (32bits) | 1 | 1 | 1 | 0 | 0 | 1 | 1 | 1 | 0 | 1 | 0 | 1 | 0 | 1 | 1 | 0 | 0 | 1 | 1 | 0 | 0 | 1 | 1 | 0 | 1 | 1 | 1 | 1 | 1 | 0 | 1 | 1 |
| SEL | L | | H | | L | | L | | L | | L | | L | | H | | L | | H | | L | | H | | L | | L | | H | | L | |
| OUTPUT (32bits) | 1 | 1 | 0 | 1 | 0 | 1 | 1 | 1 | 0 | 1 | 0 | 1 | 0 | 1 | 0 | 1 | 0 | 1 | 0 | 1 | 0 | 1 | 0 | 1 | 1 | 1 | 1 | 1 | 0 | 1 | 1 | 1 |

3rd burst

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | | | | | | | | | | | | | | | 603a | | | | | | | | | | | | | | | | | |
| INPUT (32bits) | 0 | 1 | 0 | 0 | 1 | 1 | 0 | 0 | 1 | 1 | 0 | 0 | 0 | 1 | 1 | 0 | 0 | 1 | 1 | 1 | 0 | 1 | 1 | 1 | 0 | 1 | 1 | 1 | 0 | 1 | 1 | 1 |
| SEL | L | | L | | L | | L | | L | | L | | L | | H | | L | | L | | L | | L | | L | | L | | L | | L | |
| OUTPUT (32bits) | 0 | 1 | 0 | 0 | 1 | 1 | 0 | 0 | 1 | 1 | 0 | 0 | 0 | 1 | 0 | 0 | 0 | 1 | 1 | 1 | 0 | 1 | 1 | 1 | 0 | 1 | 1 | 1 | 0 | 1 | 1 | 1 |

800
810
811
LFSR
DT
SCRAMBLER
812
OV
SV
CK
SDO
820
821a
821b
821c
822a
822b
822c
FF0
FF1
CS1
CS2
CS3
830
831a
831b
831c
831d
831e
831f
831h
PD
SEL
ISa
ISb
ISc
ISd
ISe
ISf
ISh
MUX
840
841a
841b
841c
841d
841e
841f
841h
TPO

FIG. 9

1st burst

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| INPUT (32bits) | 0 | 1 | 1 | 1 | 0 | 1 | 1 | 0 | 0 | 1 | 1 | 0 | 0 | 1 | 1 | 1 | 0 | 1 | 1 | 0 | 0 | 1 | 1 | 1 | 0 | 1 | 1 | 1 | 0 | 1 | 1 | 1 |
| SEL | L | | L | | L | | H | | L | | H | | L | | L | | L | | H | | L | | L | | L | | L | | L | | L | |
| OUTPUT (32bits) | 0 | 1 | 1 | 1 | 0 | 1 | 1 | 1 | 0 | 1 | 0 | 0 | 0 | 1 | 1 | 1 | 0 | 1 | 1 | 1 | 0 | 1 | 1 | 1 | 0 | 1 | 1 | 1 | 0 | 1 | 1 | 1 |

901a (bits 7–8), 901b (bits 11–12), 901c (bits 19–20)

2nd burst

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| INPUT (32bits) | 1 | 1 | 1 | 0 | 0 | 1 | 1 | 1 | 0 | 1 | 0 | 1 | 0 | 1 | 1 | 0 | 0 | 1 | 1 | 0 | 0 | 1 | 1 | 0 | 1 | 1 | 1 | 1 | 1 | 0 | 1 | 1 |
| SEL | L | | H | | L | | L | | L | | L | | L | | H | | L | | H | | L | | H | | L | | L | | H | | L | |
| OUTPUT (32bits) | 1 | 1 | 0 | 0 | 0 | 1 | 1 | 1 | 0 | 1 | 0 | 1 | 0 | 1 | 0 | 0 | 0 | 1 | 0 | 1 | 0 | 1 | 1 | 1 | 1 | 1 | 1 | 1 | 1 | 1 | 1 | 1 |

902a (bits 3–4), 902b (bits 15–16), 902c (bits 19–20), 902d (bits 23–24), 902e (bits 29–30)

3rd burst

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| INPUT (32bits) | 0 | 1 | 0 | 0 | 1 | 1 | 0 | 0 | 1 | 1 | 0 | 0 | 0 | 1 | 1 | 0 | 0 | 1 | 1 | 1 | 0 | 1 | 1 | 1 | 0 | 1 | 1 | 1 | 0 | 1 | 1 | 1 |
| SEL | L | | L | | L | | L | | L | | L | | L | | H | | L | | L | | L | | L | | L | | L | | L | | L | |
| OUTPUT (32bits) | 0 | 1 | 0 | 0 | 1 | 1 | 0 | 0 | 1 | 1 | 0 | 0 | 0 | 1 | 1 | 1 | 0 | 1 | 1 | 1 | 0 | 1 | 1 | 1 | 0 | 1 | 1 | 1 | 0 | 1 | 1 | 1 |

903a (bits 15–16)

SEMICONDUCTOR DEVICE

CROSS-REFERENCE TO RELATED APPLICATION

This application claims priority to Korean Patent Application No. 10-2022-0079970, filed in the Korean Intellectual Property Office on Jun. 29, 2022, the disclosure of which is hereby incorporated herein by reference in its entirety.

BACKGROUND

1. Field

The present disclosure relates to integrated circuit devices.

2. Description of the Related Art

As operating speeds of integrated circuit devices increase, a skew between a data signal and a clock signal transmitted and received by a semiconductor device (e.g., memory device) and/or a skew between a data signal and a data strobe may increase. In order to maintain reliability of data and support increasing speed of memory devices, skews that occur among data signals, data strobes and clock signals may need to be corrected.

SUMMARY

An embodiment of the present disclosure includes a semiconductor device that reduces skew by generating a training pattern and transmitting the generated training pattern to perform data training.

An embodiment includes a semiconductor device that generates a training pattern from which an invalid symbol is removed.

An embodiment of the present disclosure has been made in an effort to provide a semiconductor device which efficiently generates the training pattern.

An embodiment of the present disclosure includes a semiconductor device including: (i) a sequence data generator configured to generate sequence data, (ii) a symbol changer configured to generate a training pattern by replacing the same bitstream as a predetermined symbol among a plurality of consecutive bitstreams within the sequence data with an alternative symbol, and (iii) a driver configured to output the training pattern to an external semiconductor device.

The sequence data generator may include a PRBS sequence generator for generating a pseudo random binary sequence (PRBS) based on a seed value for each clock cycle, and a scrambler, which is configured to generate the sequence data by performing an XOR operation between an option value (having the same bit number as the PRBS) and the PRBS.

In some embodiments, the symbol changer may include a symbol generator for generating and outputting the alternative symbol for each clock cycle, a detector for outputting a selection signal at a predetermined logic level in response to the same bitstream as the predetermined symbol among the plurality of bitstreams, and a selector, which is configured to replace the same bitstream as the predetermined symbol with the alternative symbol in the sequence data, based on the logical level of the selection signal. In some instances, the symbol generator may cyclically generate and output the alternative symbol as a different value for each clock cycle.

In some embodiments, the symbol generator may be configured as a cyclic shift register, which includes a plurality of flip-flops that cyclically generate and output each bit value of the alternative symbol as a different value for each clock cycle. The symbol generator may also generate a plurality of alternative symbols including a first alternative symbol and a second alternative symbol having different values for each clock cycle. Moreover, when the plurality of bitstreams are grouped into a plurality of groups, each of the plurality of groups including two or more bitstreams, the symbol changer may use the first alternative symbol as the alternative symbol in a first group among the plurality of groups, and use the second alternative symbol as the alternative symbol in a second group among the plurality of groups. In other embodiments, the symbol generator may be a cyclic shift register including a plurality of flip-flops which cyclically generate and output a bit value of each of a plurality of alternative symbols as a different value for each clock cycle.

The detector may include a plurality of pattern detectors, which segment and receive the sequence data into a plurality of bit units, and output the selection signal at an enable level when the plurality of consecutive bitstreams received by the unit of the plurality of bits is the same as the predetermined symbol. In these embodiments, the selector may include a plurality of multiplexers, with each including a first input stage that segments and receives the sequence data by the unit of the plurality of bits, a second input stage into which the alternative symbol is input, and an output stage which outputs the plurality of consecutive bitstreams received by the unit of the plurality of bits or the alternative symbol according to the level of the selection signal.

The semiconductor device may further include: (i) a receiver receiving a plurality of external training patterns from the external semiconductor device; and (ii) a training module generating a counting value indicating whether the plurality of external training patterns and the plurality of training patterns match each other. A driver may be provided to output the counting value to the external semiconductor device. In some instances, the receiver may include a plurality of samplers sampling the plurality of external training patterns based on a clock signal provided from the external semiconductor device. In addition, the training module may include a plurality of scramblers outputting a plurality of result data by performing the XOR operation of a plurality of sampling data output by the plurality of samplers and the plurality of training patterns, and a plurality of counters that count a value, which indicates that the plurality of sampling data and the plurality of training patterns do not match each other, to thereby generate the counting value in the plurality of result data.

Another embodiment of the present disclosure provides a memory system which includes a memory controller having a first pattern generator that generates first sequence data based on a seed value, and then, when a plurality of consecutive bitstreams in the first sequence data is the same as a predetermined symbol, generates a first training pattern by replacing the plurality of consecutive bitstreams in the first sequence data with an alternative symbol. A memory device is provided that includes a second pattern generator, which: (i) receives the seed value from the memory controller, (ii) generates second sequence data based on the seed value, and (iii) when a plurality of consecutive bitstreams in the second sequence data is the same as a predetermined symbol, generates a second training pattern by replacing the plurality of consecutive bitstreams in the second sequence data with the alternative symbol.

The memory controller may receive a second training pattern from the memory device, and may compare a first training pattern and a second training pattern to perform read training. The memory controller may also receive a data signal including the second training pattern from the memory device through a data line, receive a data strobe signal through a data strobe line, and adjust a delay degree of the data strobe signal based on whether a sampling pattern acquired by sampling the data signal based on the data strobe signal and the first training pattern match each other to perform the read training.

The memory device may receive the first training pattern from the memory controller and transmit, to the memory controller, the first training pattern and a counting result value of comparing the first training pattern. In addition, the memory device may receive the data signal including the first training pattern from the memory controller through the data line, receive a data clock, and transmit, to the memory controller, a counting result value indicating whether a sampling pattern acquired by sampling the data signal based on a data clock and the second training pattern match each other.

In yet another embodiment of the present disclosure, a semiconductor device is provided that includes: (i) a sequence data generator configured to generate sequence data including a plurality of consecutive bitstreams, (ii) a plurality of pattern detectors configured to receive the plurality of bitstreams, respectively, with each pattern detector configured to output a selection signal having a level determined based on a result of comparing a received bitstream among the plurality of bitstreams and an option value, and (iii) a plurality of multiplexers that are configured to generate a training pattern as an output, with each multiplexer receiving a bitstream received by a corresponding pattern detector among the plurality of pattern detectors and an alternative symbol, and outputting any one of the alternative symbol and the received bitstream based on the level of the selection signal output by the corresponding pattern detector.

The semiconductor device may further include a cyclic shift register, which cyclically outputs a plurality of alternative symbols including a first alternative symbol and a second alternative symbol having different values as a plurality of different values. And, when the plurality of bitstreams is grouped into a plurality of groups including two or more bitstreams, a first group multiplexer corresponding to a first group among the plurality of groups among a plurality of multiplexers may use a first alternative symbol as an alternative symbol and a second group multiplexer corresponding to a second group among the plurality of groups among the plurality of multiplexers may use a second alternative symbol as the alternative symbol.

BRIEF DESCRIPTION OF THE DRAWINGS

FIG. 6 is a table showing a training pattern generated by the memory device according to an embodiment.

FIG. 9 is a table showing a training pattern generated by the memory device according to an embodiment.

DETAILED DESCRIPTION OF THE EMBODIMENTS

Figure 1:
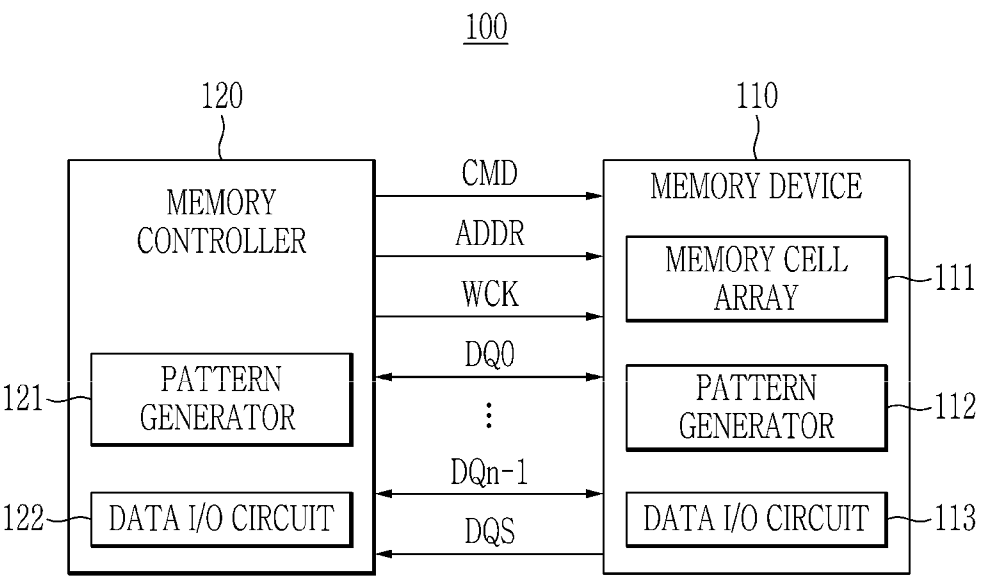
FIG. 1 is a block diagram of a memory system according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In a flowchart described with reference to the drawings, an operation order may be changed, and various operations may be merged or any operation may be split, and a specific operation may not be performed.

Further, unless an expression disclosed as a singular number may be interpreted as a singular number or a plural number unless an explicit expression such as “one” or “single” is used. Terms including an ordinary number, such as first and second, are used for describing various elements, but the elements are not limited by the terms. The terms are used to discriminate one constituent element from another component. FIG. 1 is a block diagram of a memory system according to an embodiment.

Referring to FIG. 1 the memory system 100 includes a memory device 110 and a memory controller 120. In one or more embodiments, the memory device 110 and the memory controller 120 are connected via a memory interface to transmit and receive signals through the memory interface.

The memory device 110 includes a memory cell array 111, a pattern generator 112, and a data I/O circuit 113. The memory cell array 111 includes a plurality of memory cells connected to a plurality of rows and a plurality of columns. In one or more embodiments, the row may be defined by word lines and the column may be defined by bit lines. The pattern generator 112 may generate a training pattern. The pattern generator 112 may generate a random number pattern or a pseudo random number pattern. The data I/O circuit 113 may receive data transferred from the outside in the memory cell array 111 or output the data stored in the memory cell array 111 to the outside (e.g., the memory controller 120) of the memory device 110. For example, the data I/O circuit 113 may transmit and receive data signals through a plurality of data lines DQ0, . . . , DQn−1, and transmit a data strobe signal through a data strobe line DQS.

The pattern generator 112 may generate a pattern including the entirety or a part of a pseudo random binary sequence or another sequence. In one or more embodiments, the pattern generator 112 may generate the pattern including the entirety or a part of the pseudorandom binary sequence (PRBS) or another sequences based on a seed value according to an OP-code transferred by the memory controller 120.

Hereinafter, it will be described that the pattern generator 112 generates the pattern including the PRBS.

The pattern generator 112 may generate the training pattern in response to a read training command or a write training command from the memory controller 120.

The training pattern includes a plurality of bits. For example, the training pattern may be 32-bit data. The pattern generator 112 may generate a training pattern in which a predetermined symbol is replaced with an alternative symbol in the sequence within the generated pattern. In one or more embodiments, the pattern generator 112 may change a value of the alternative symbol based on receiving the read training command or the write training command from the memory controller 120.

The pattern generator 112 may generate the training pattern for each of the plurality of data lines DQ0, . . . , DQn−1, where n is a natural number greater than 1. In one or more embodiments, the pattern generator 112 may generate the training pattern in which a predetermined symbol is changed into different alternative symbols according to the plurality of data lines DQ0, . . . , DQn−1 in the sequence within the generated pattern. The pattern generator 112 may generate a training pattern corresponding to any one of the plurality of data lines DQ0, . . . , DQn−1 in response to one read training command or write training command of the memory controller 120.

The data I/O circuit 113 may sample the data signals received through the plurality of data lines DQ0, . . . , DQn−1 based on a data clock WCK received from the memory controller 120. In one or more embodiments, the data I/O circuit 113 may sample the training pattern received through the plurality of data lines DQ0, . . . , DQn−1 based on the data clock WCK.

The data I/O circuit 113 may compare whether a sampled sampling pattern and the training pattern, which the pattern generator 112 generates in response to the write training command from the memory controller 120, match each other. The data I/O circuit 113 may count a number in which each bit data of the sampling pattern and each bit data of the training pattern match each other. The data I/O circuit 113 may transmit a counting result value to the memory controller 120. For example, the data I/O circuit 113 may generate a scrambling result through an exclusive OR (XOR) operation between the sampling pattern and the training pattern generated by the pattern generator 112. The data I/O circuit 113 may count the number of 0s in the scrambling result. The data I/O circuit 113 may transmit the counting result value to the memory controller 120 according to the read training command of the memory controller 120.

The memory controller 120 provides a signal to the memory device 110 to control a memory operation of the memory device 110. The signal may include a command CMD and an address ADDR. In one or more embodiments, the memory controller 120 provides the command CMD and the address ADDR to the memory device 110 to control a memory operation such as access to, and read from or write to the memory cell array 111. Data may be transferred from the memory cell array 111 to the memory controller 120 according to the read operation, and data may be transferred from the memory controller 120 to the memory cell array 111 according to the write operation.

The command CMD may include an active command, a read/write command, and a read/write training command. The active command may be a command that switches a target row of the memory cell array 111 to an active state in order to write data to the memory cell array 111 or read data from the memory cell array 111. A memory cell of the target row may be activated in response to the activate command. The read/write command may be a command for performing the read or write operation in a target memory cell of the row which is switched to the active state. The read/write training command may be a command for the memory controller 120 to align a center of a data eye output from the memory device 110 or a center of a data eye output from the memory controller 120. In one or more embodiments, the command CMD may further include a refresh command. The refresh command may be a command for performing a refresh operation in the memory cell array 111.

The memory controller 120 applies, to the memory device 110, a system clock CK and the data clock WCK in order to control data input/output. The system clock CK may be provided in the form of differential signals having complementary phases with each other. The data clock WCK may be provided in the form of differential signals having complementary phases with each other.

The system clock CK is a clock signal for controlling a transmission rate of the command CMD and/or the address ADDR applied to perform a data input/output operation. The data clock WCK is a clock for controlling an input/output rate of the data DATA. In one or more embodiments, the command CMD and the address signal ADDR are transmitted based on system clock signals CK and CKB. The data DATA is transmitted based on the data clock signal WCK.

The memory controller 120 includes a pattern generator 121 and a data I/O circuit 122. The pattern generator 121 may generate the training pattern similarly to the pattern generator 112 of the memory device 110. The operation of the pattern generator 121 is the same as or similar to the operation of the pattern generator 112, so a description thereof is omitted. The data I/O circuit 122 may output the data to the memory device 110 or receive the data output from the memory device 110. For example, the data I/O circuit 122 may transmit and receive data signals through the plurality of data lines DQ0, . . . , DQn−1, and receive the data strobe signal through the data strobe line DQS.

The data I/O circuit 122 may sample the data signals received through the plurality of data lines DQ0, . . . , DQn−1 based on the data strobe signal received through the data strobe line DQS. When the memory controller 120 transmits the read training command to the memory device 110, the data I/O circuit 122 may perform read training by adjusting a delay degree of the data strobe signal by sampling the training pattern output from the memory device 110 according to the read training command. For example, the data I/O circuit 122 may receive the training pattern output from the memory device 110 according to the read training command. The data I/O circuit 122 may sample the training pattern output from the data line DQ0 among the plurality of data lines DQ0, . . . , DQn−1 based on the data strobe signal. The data I/O circuit 122 may compare whether the sampled sampling pattern and the training pattern generated by the pattern generator 121 of the memory controller 120 match each other. The data I/O circuit 122 may adjust the delay degree of the data strobe signal used for sampling the data output from the data line DQ0 based on a comparison result. The data I/O circuit 122 may perform the read training for the data transmitted from the memory device 110 through the plurality of data lines DQ0, . . . , DQn−1, at multiple times.

The pattern generator 121 may generate the training pattern in order to perform write training. The pattern generator 121 may generate the training patterns differently in response to the plurality of data lines DQ0, . . . , DQn−1, respectively. When the memory controller 120 transmits the write training command to the memory device 110, the data I/O circuit 122 may transmit a plurality of training patterns generated by the pattern generator 121 to the memory device 110 through the plurality of data lines DQ0, . . . , DQn−1. The memory controller 120 may transmit the write training command to the memory device 110, and then transmit the read training command. The data I/O circuit 122 may receive the counting result value output from the memory device 110 by the read training command to perform write training by adjusting a transmission timing of the data transmitted to the plurality of data lines DQ0, . . . , DQn−1. The data I/O circuit 122 may perform the write training for the data transmitted to the memory device 110 through the plurality of data lines DQ0, . . . , DQn−1, respectively at multiple times.

In one or more embodiments, the memory controller 120 may access the memory device 110 according to a request from an external host of the memory system 100. The memory controller 120 may communicate with a host by using various protocols. The memory device 110 may be a storage device based on the semiconductor device. In one or more embodiments, the memory device 110 may include a dynamic random access memory (DRAM) device. In one or more embodiments, the memory device 110 may include another volatile or non-volatile memory device in which the pattern generator is used.

Hereinafter, the pattern generator 112 of the memory device 110 will be described with reference to FIGS. 2 to 9. However, hereinafter, the description of the pattern generator 112 of the memory device 110 may be equally applied to the pattern generator 121 of the memory controller 120.

Figure 2:
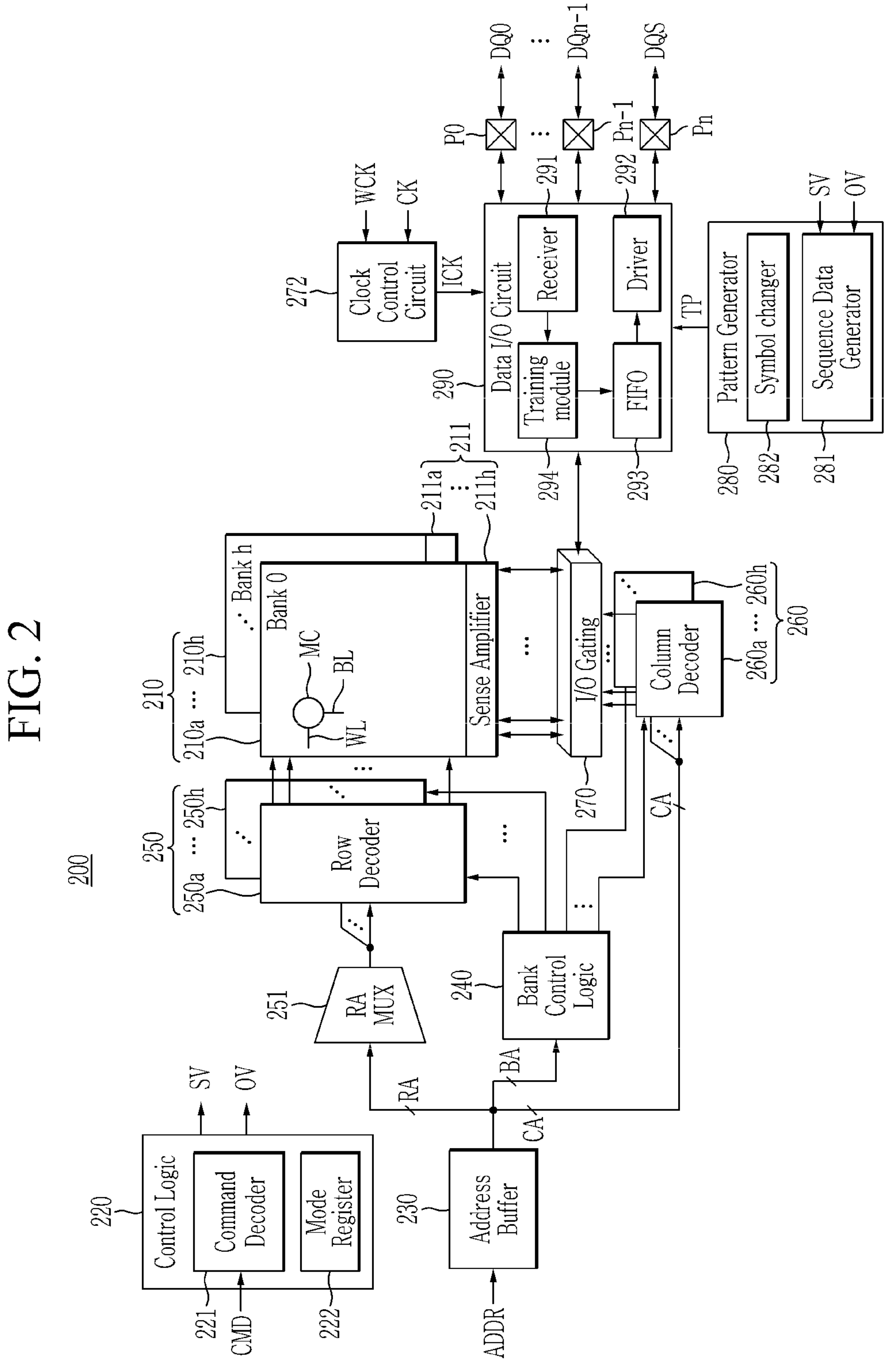
FIG. 2 is a block diagram illustrating a memory device according to an embodiment.

FIG. 2 is a block diagram illustrating a memory device according to an embodiment. As shown by FIG. 2, the memory device 200 includes a memory cell array 210, a sense amplifier 211, a control logic circuit 220, an address buffer 230, a row decoder 250, a column decoder 260, an I/O gating circuit 270, a clock control circuit 272, a pattern generator 280, and a data I/O circuit 290.

The memory cell array 210 includes a plurality of memory cells MC. In one or more embodiments, the memory cell array 210 may include a plurality of memory banks 210*a* to 210*h*. Eight memory banks (BANK0 to BANKh) 210*a* to 210*h* are illustrated in FIG. 2, but the number of memory banks is not limited thereto. Each of the memory banks 210*a* to 210*h* may include a plurality of rows, a plurality of columns, and a plurality of memory cells MC arranged at intersections of the plurality of rows and the plurality of columns. In one or more embodiments, the plurality of rows may be defined by a plurality of word lines WL and the plurality of columns may be defined by a plurality of bit lines BL.

The control logic circuit 220 controls the operation of the memory device 200. For example, the control logic circuit 220 may generate a control signal for the memory device 200 to perform a read operation, a write operation, an offset calibration operation, etc. In one or more embodiments, the control logic circuit 220 may include a command decoder 221. The command decoder 221 may generate the control signal by decoding the command CMD received from the memory controller (see, e.g., 120 in FIG. 1). The command decoder 221 may recognize the OP-code of the command CMD and read a seed value SV included in the OP-code. The seed value SV may be used for generating a pattern corresponding to the plurality of data lines DQ0, . . . , DQn−1. The command decoder 221 may recognize the OP-code of the command CMD and read an option value OV included in the OP-code. The command decoder 221 may read the option value OV in each of a plurality of commands CMD, and provide a plurality of read option values OV to the pattern generator 280. The plurality of option values OV may be used for generating a pattern corresponding to any one of the plurality of data lines DQ0, . . . , DQn−1. In one or more embodiments, the control logic circuit 220 may further include a mode register 222 for setting an operation mode of the memory device 200.

The address buffer 230 receives the address ADDR provided from the memory controller 120. The address ADDR includes a row address RA indicating the row of the memory cell array 210 and a column address CA indicating the column. The row address RA is provided to the row decoder 250 and the column address CA is provided to the column decoder 260. In one or more embodiments, the memory device 200 may further include a row address multiplexer 251. The row address RA may be provided to the row decoder 250 through the row address multiplexer 251. In one or more embodiments, the address ADDR may further include a bank address BA indicating the memory bank, and the bank address BA may be provided to the bank control logic 240.

In one or more embodiments, the memory device 200 may further include the bank control logic 240 which generates a bank control signal in response to the bank address BA. The bank control logic 240 may activate the row decoder 250 corresponding to the bank address BA among a plurality of row decoders 250 and activate the column decoder 260 corresponding to the bank address BA among a plurality of column decoders 260, in response to the bank control signal.

The row decoder 250 selects a row to be activated among a plurality of rows of the memory cell array 210 based on a row address. To this end, the row decoder 250 may apply driving voltage to a word line corresponding to the row to be activated. In one or more embodiments, a plurality of row decoders 250*a* to 250*h* corresponding to the plurality of memory banks 210*a* to 210*h* may be provided.

The column decoder 260 selects a column to be activated among a plurality of columns of the memory cell array 210 based on a column address. To this end, the column decoder 260 may activate the sense amplifier 211 corresponding to the column address CA through the I/O gating circuit 270. In one or more embodiments, a plurality of column decoders 260*a* to 260*h* corresponding to the plurality of memory banks 210*a* to 210*h* may be provided. In one or more embodiments, the I/O gating circuit 270 may gate input/output data, and include a data latch for storing data read from the memory cell array 210 and a write driver for writing data to the memory cell array 210. The data read from the memory cell array 210 may be sensed by the sense amplifier 211, and stored in the I/O gating circuit 270 (e.g., data latch). In one or more embodiments, a plurality of sense amplifiers 211*a* to 211*h* corresponding to the plurality of memory banks 210*a* to 210*h*, respectively may be provided.

In one or more embodiments, the data (e.g., the data stored in the data latch) read from the memory cell array 210 may be provided to the memory controller 120 through the data I/O circuit 290. The data to be written to the memory cell array 210 may be provided from the memory controller 120 to the data I/O circuit 290, and the data provided to the data I/O circuit 290 may be provided to the I/O gating circuit 270.

The clock control circuit 272 may receive the system clock CK and the data clock WCK. The clock control circuit 272 may generate an internal data clock ICK by using the system clock CK and the data clock WCK. The clock control circuit 272 may provide the internal data clock ICK to the data I/O circuit 290. The pattern generator 280 may generate a training pattern TP according to the read training command and/or the write training command.

The pattern generator 280 may include a sequence data generator 281 and a symbol changer 282. The sequence data generator 281 may generate sequence data by using the seed value SV and the option value OV. In one or more embodiments, the sequence data generator 281 may generate the PRBS by using the seed value SV. The sequence data generator 281 may generate a PRBS of at least 32 bits. The PRBS may be generated according to a specific selected polynomial. As an example, the sequence data generator 281 may include a self-seeded storage element, such as a linear feedback shift register (LFSR). The PRBS is a pseudo-random bitstream which is a random bitstream that is generated periodically. The sequence data generator 281 may generate sequence data by the XOR operation of the PRBS and the option value OV. The sequence data generator 281 may further include a scrambler for the XOR operation of the PRBS and the option value OV.

The symbol changer 282 may generate the training pattern TP based on the sequence data. In an embodiment, the symbol changer 282 may generate the training pattern TP by replacing a predetermined symbol with an alternative symbol in the sequence data. When the predetermined symbol is detected in the sequence data, the symbol changer 282 may replace the predetermined symbol with the alternative symbol. When a plurality of consecutive bitstreams of the sequence data is the same as the predetermined symbol, the symbol changer 282 may replace the corresponding bitstream with an alternative bitstream. In an embodiment, the symbol changer 282 may replace a first symbol (e.g., an invalid symbol) with a second symbol that is a valid symbol in the sequence data. The valid symbol may include at least one valid symbol bit. In one or more embodiments, the symbol changer 282 may replace 32-bit sequence data with a 2-bit symbol unit. For example, the predetermined symbol, i.e., an invalid symbol, may be "10", and the valid symbol may be "00", "01", and "11". The symbol changer 282 may replace the invalid symbol with the valid symbol by segmenting the 32-bit sequence data into the 2-bit symbol units.

The data I/O circuit 290 may be connected to the plurality of data lines DQ0, . . . , DQn−1 through a plurality of data pins P0, . . . , Pn−1. The data I/O circuit 290 may be connected to the data strobe line DQS through a data strobe pin Pn. In an embodiment, a multiple symbol (or multiple level) modulation scheme may be used for modulating a signal communication between the memory controller (120 in FIG. 1) and the memory device 200. An example of the multiple symbol modulation scheme includes pulse amplitude modulation (PAM) (e.g., PAM3, PAM4, PAM8, etc.), quadrature amplitude modulation (QAM), quadrature phase shift keying (QPSK), and/or others, but is not limited thereto. A multiple symbols signal (e.g., PAM3 signal or PAM4 signal) may be a signal modulated by using a modulation scheme including at least three levels in order to encode information of 1 bit or more. Multiple symbol modulation scheme and symbols may be referred to as non-binary, multi-bit, or high-order modulation scheme and symbols alternatively. Hereinafter, it is assumed and described that the data I/O circuit 290 uses the PAM3 modulation scheme. A 3b-2 PAM3 encoder may encode 3-bit data to 2-symbol data based on three voltage levels (e.g., voltage level "H", voltage level "M", and voltage level "L") within consecutive first and second unit intervals (UI).

The voltage level "H" expressed in each unit interval may correspond to symbol "00", the voltage level "M" may correspond to symbol "01", and the voltage level "L" may correspond to symbol "11". In an embodiment, the data I/O circuit 290 may output 2-symbol data modulated through a 3 bit to 2 (3b-2) PAM3 encoder at three voltage levels. In one or more embodiments, the invalid symbol may be a symbol in which data modulated through the PAM3 encoder is not output at three voltage levels by the data I/O circuit 290. The data I/O circuit 290 may segment the modulated data into the 2-bit symbol units and output the data at any one of three voltage levels. For example, the data I/O circuit 290 may output the symbol "00" at the voltage level "H", output the symbol "01" at the voltage level "M", and output the symbol "11" at the voltage level "L". That is, since the data I/O circuit 290 does not output the symbol "10", the symbol "10" may be the invalid symbol.

The data I/O circuit 290 includes a receiver 291, a driver 292, a first-in-first-out (FIFO) circuit 293, and a training module 294. The receiver 291 may sample the data signals transferred through the plurality of data lines DQ0, . . . , DQn−1. The receiver 291 may sample the data signal by synchronizing with the internal data clock ICK. In an embodiment, the receiver 291 may sample the training pattern received through the plurality of data lines DQ0, . . . , DQn−1 by synchronizing with the internal data clock ICK. In addition, the receiver 291 may output a sampling pattern acquired by sampling the training pattern to the training module 294.

The driver 292 may output data stored in the memory cell array 210 to the outside of the memory device 200. The driver 292 may output the data through the plurality of data lines DQ0, . . . , DQn−1, and output the data strobe signal through the data strobe line DQS. The driver 292 may output data stored in the latch of the FIFO circuit 293 to the plurality of data lines DQ0, . . . , DQn−1.

The FIFO circuit 293 may include a plurality of latches. The FIFO circuit 293 may store the counting result value according to the write training after the write training command is received. When the read training command is received, the FIFO circuit 293 may output the counting result value to the driver 292.

Figure 3:
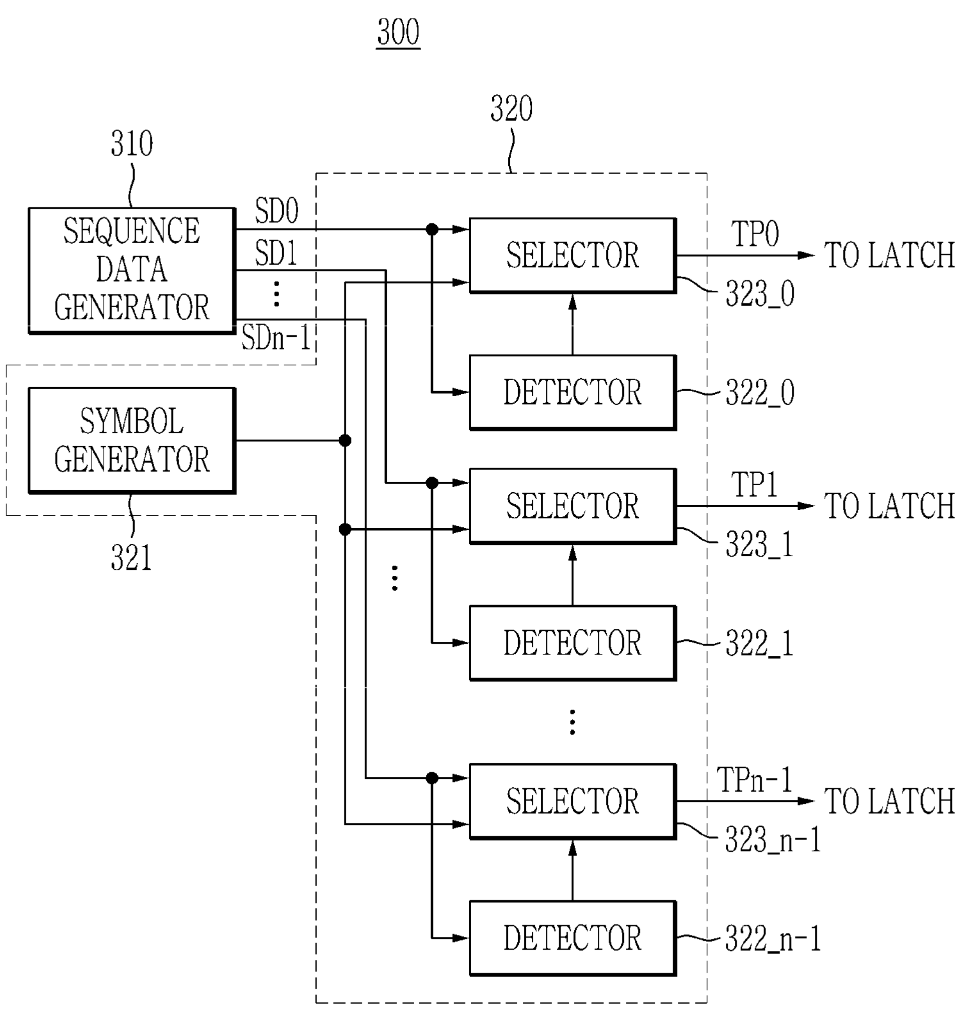
FIG. 3 is a block diagram illustrating a pattern generator of the memory device according to an embodiment.

The training module 294 may compare the sampling pattern output from the receiver 291 and the training pattern TP generated by the pattern generator 280. The training module 294 may compare the sampling pattern and the training pattern TP after the write training command is received. The training module 294 may count a number in which each bit data of the sampling pattern and each bit data of the training pattern TP match each other. The training module 294 may output the counting result value to the FIFO circuit 293. In one or more embodiments, the training module 294 may generate the scrambling result through the XOR operation of the sampling pattern and the training pattern TP. The training module 294 may count the number of 0s in the scrambling result FIG. 3 is a block diagram illustrating a pattern generator of a memory device according to an embodiment. Referring to FIG. 3, the pattern generator 300 may include a sequence data generator 310 and a symbol changer 320. The sequence data generator 310 may generate a plurality of sequence data SD0, SD1, . . . , SDn−1. The plurality of sequence data SD0, SD1, . . . , SDn−1 may correspond to the plurality of data lines. Each of the plurality of sequence data SD, SD1, . . . , SDn−1 may include the plurality of bitstreams.

The sequence data generator 310 may output the plurality of sequence data SD0, SD1, . . . , SDn−1 to the symbol changer 320.

The symbol changer 320 may include a symbol generator 321, a plurality of detectors 322_0, 322_1, . . . , 322_*n*−1, and a plurality of selectors 323_0, 323_1, . . . , 323_*n*−1. The symbol generator 321 may generate a valid alternative symbol, and output the generated valid alternative symbol to the plurality of selectors 323_0, 323_1, . . . , 323_*n*−1. The symbol generator 321 may output the alternative symbol when the sequence data generator 310 operates.

In an embodiment, the symbol generator 321 may generate and output alternative symbols having different values for each cycle. For example, the symbol generator 321 may output "00" at a first cycle, output "01" at a second cycle, and output "11" at a third cycle.

In an embodiment, the symbol generator 321 may generate alternative symbols having different values within one cycle. For example, the symbol generator 321 may generate and output all of "00", "01", and "11" in one cycle.

The plurality of detectors 322_0, 322_1, . . . , 322_*n*−1 may detect a predetermined symbol in the plurality of sequence data SD0, SD1, . . . , SDn−1. In an embodiment, the detector 322_0 may detect the same bitstream as the predetermined symbol among the plurality of consecutive bitstreams of the sequence data SD0. For example, the detector 322_0 may detect whether the sequence data SD0 includes the predetermined symbols by segmenting the plurality of consecutive bitstreams of the sequence data SD0 into the 2-bit symbol units. When the plurality of detectors 322_0, 322_1, . . . , 322_*n*−1 detects the predetermined symbol within the plurality of sequence data SD0, SD1, . . . , SDn−1, the plurality of detectors 322_0, 322_1, . . . , 322_*n*−1 may output a selection signal at a predetermined logic level to the plurality of selectors 323_0, 323_1, . . . , 323_*n*−1 so that the plurality of selectors 323_0, 323_1, . . . , 323_*n*−1 replaces the predetermined symbol with the alternative symbol and output the alternative symbol.

The plurality of selectors 323_0, 323_1, . . . , 323_*n*−1 may output the plurality of sequence data SD0, SD1, SDn−1 or replace a predetermined symbol (i.e., a plurality of consecutive bitstreams which is the same as the predetermined symbol) within the plurality of sequence data SD0, SD1, . . . , SDn−1 with the alternative symbol and output the alternatively symbol, according to the selection signal input from the plurality of detectors 322_0, 322_1, . . . , 322_*n*−1. The plurality of selectors 323_0, 323_1, . . . , 323_*n*−1 may output a plurality of training patterns TP0, TP1, . . . , TPn−1 to the plurality of latches corresponding to the plurality of data lines.

Figure 4:
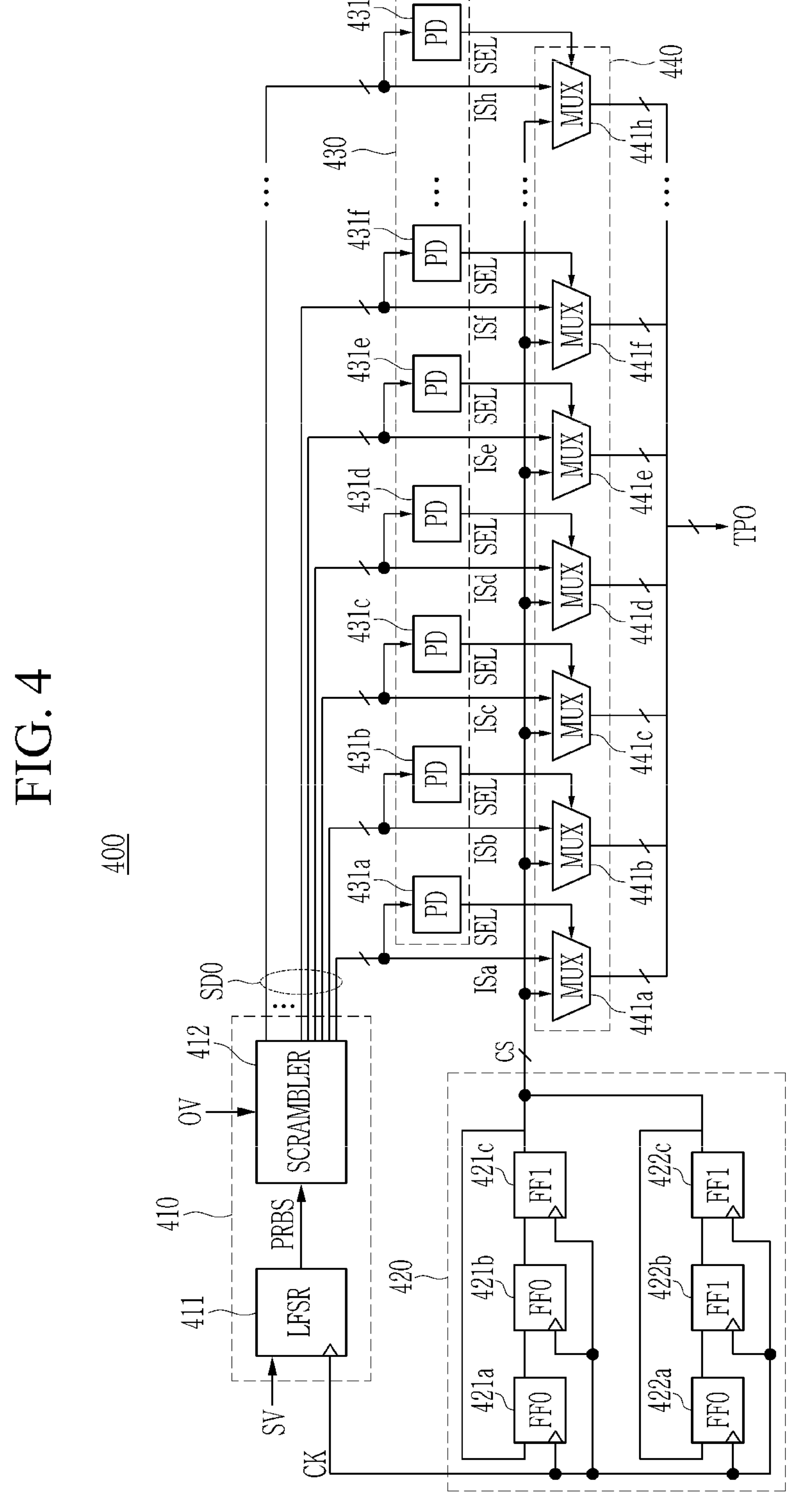
FIG. 4 is a block diagram specifically illustrating the pattern generator of the memory device according to an embodiment.

FIG. 4 is a block diagram specifically illustrating the pattern generator of the memory device according to an embodiment.

Referring to FIG. 4, the pattern generator 400 may include a sequence data generator 410, a symbol generator 420, a detector 430, and a selector 440. The sequence data generator 410 may include a PRBS sequence data generator 411 and a scrambler 412. The PRBS sequence data generator 411 may generate PRBS data based on the seed value SV. In some embodiments, the PRBS sequence data generator 411 may be a 32-bit Fibonacci PRBS sequence data generator capable of the PRBS data. For example, the PRBS sequence data generator 411 may be an LFSR. The LFSR may have a feedback loop which may include multiple registers and multiple XOR circuits, and in this case, the number of registers equivalent to an order of the polynomial and locations of the XOR circuits may determine characteristics of a polynomial circuit. The LFSR may have a structure in which a value input into the register is calculated by a linear function of previous state values. As an example, the LFSR may use the XOR operation by the linear function. Here, since the operation of the LFSR is deterministic, a sequence of values generated by the LFSR may be determined by the previous value. Further, since the number of values which the register may have is finite, the sequence may be repeated at a specific cycle. The system clock CK is equally applied to the PRBS sequence data generator 411 and the symbol generator 420 in FIG. 4, but the system clock CK, the data clock WCK, the internal data clock ICK, or a clock generated from any one thereof may be applied to the PRBS sequence data generator 411 and the symbol generator 420.

The scrambler 412 may be provided for each data line. The scrambler 412 may generate sequence data SD0 by the XOR operation of the PRBS data and the option value OV by the unit of bits. In one or more embodiments, when the PRBS data is 32 bits, the option value OV may also be 32 bits. When one command includes an OP-code of 11 bits and the option value OV included in the OP-code of 11 bits is 8 bits, the scrambler 412 may use four option values OV read from the OP-code included in four commands and perform the XOR operation of the option values and the PRBS data.

The symbol generator 420 may generate an alternative symbol CS. The alternative symbol CS may have the same bit number as the predetermined symbol. In an embodiment, the alternative symbol CS may be a plurality of bitstream data. For example, the predetermined symbol and the alternative symbol CS may be 2 bits. The symbol generator 420 may generate the value of the alternative symbol CS differently for each clock cycle. For example, the symbol generator 420 may sequentially generate "11", "01", and "00" as the value of the alternative symbol CS for each clock cycle. The symbol generator 420 may be a cyclic shift resistor that includes a plurality of flip-flops 421*a*, 421*b*, 421*c*, 422*a*, 422*b*, and 422*c*. The flip-flops 421*a*, 421*b*, and 422*a* may output a logic value "0" by default, and the flip-flops 421*c*, 422*b*, and 422*c* may output a logic value "1" by default. The symbol generator 420 may output outputs of the flip-flops 421*c* and 422*c* as the alternative symbol CS.

The detector 430 may include a plurality of pattern detectors 431*a*, 431*b*, 431*c*, 431*d*, 431*e*, 431*f*, . . . , 431*h*. The plurality of pattern detectors 431*a*, 431*b*, 431*c*, 431*d*, 431*e*, 431*f*, . . . , 431*h* may segment and receive the plurality of consecutive bitstreams of the sequence data SD0 into a plurality of bit units. In an embodiment, the plurality of pattern detectors 431*a*, 431*b*, 431*c*, 431*d*, 431*e*, 431*f*, . . . , 431*h* may segment and receive the plurality of consecutive bitstreams of the sequence data SD0 into 2-bit units. Therefore, all of symbols ISa, ISb, ISc, ISd, ISe, ISf, ISh input into the plurality of pattern detectors 431*a*, 431*b*, 431*c*, 431*d*, 431*e*, 431*f*, . . . , 431*h*, respectively may be 2 bits. That is, each symbol may be data acquired by segmenting the sequence data SD0 into 2-bit units.

Each of the plurality of pattern detectors 431*a*, 431*b*, 431*c*, 431*d*, 431*e*, 431*f*, . . . , 431*h* may detect whether the input symbols ISa, ISb, ISc, ISd, ISe, ISf, ISh are the same as the predetermined symbol. Each of the plurality of pattern detectors 431*a*, 431*b*, 431*c*, 431*d*, 431*e*, 431*f*, . . . , 431*h* may output a selection signal SEL when the input symbols ISa, ISb, ISc, ISd, ISe, ISf, ISh are the same as the predetermined symbol (i.e., the invalid symbol). For example, each of the plurality of pattern detectors 431*a*, 431*b*, 431*c*, 431*d*, 431*e*, 431*f*, . . . , 431*h* may output the selection signal SEL when the input symbols ISa, ISb, ISc, ISd, ISe, ISf, ISh are the same as: "10". The plurality of pattern detectors 431*a*, 431*b*, 431*c*, 431*d*, 431*e*, 431*f*, . . . , 431*h* will be described with reference to FIG. 5 jointly.

Figure 5:
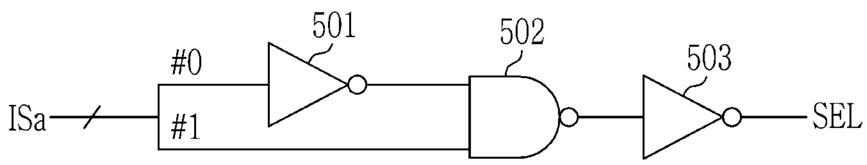
FIG. 5 is a logical circuit diagram illustrating a pattern detector of the memory device according to an embodiment.

FIG. 5 is a logical circuit diagram illustrating a pattern detector of the memory device according to an embodiment. In FIG. 5, the pattern detector 431*a* to which the symbol ISa is applied is described as an example. When the input 2-bit symbol ISa is the same as the predetermined symbol (e.g., "10"), the pattern detector 500 may output a selection signal SEL at an enable level (e.g., the logic value "H"). The pattern detector 500 may include two NOT gates 501 and 503 (i.e., inverters), and one 2-input NAND gate 502. As shown, an LSB value #0 of the symbol ISa may be input into an input of the NOT gate 501. An output of the NOT gate 501 may be connected to a first input stage of the NAND gate 502. An MSB value #1 of the symbol ISa may be connected to a second input stage of the NAND gate 502. The output of the NAND gate 502 may be connected to the input of NOT gate 503. The NOT gate 503 may output the selection signal SEL. That is, the pattern detector 500 may have three gates 501, 502, and 503 between the input and the output. Therefore, only when the MSB value #1 is 1 and the LSB value #0 is 0, will the NOT gate 503 output the selection signal SEL of the logic value "H; in all other cases, the NOT gate 503 will output the selection signal SEL of the logic value "L".

Referring back to FIG. 4, the selector 440 may output the training pattern TP0 by using the sequence data SD0 and the alternative symbol CS. The selector 440 may include a plurality of multiplexers 441*a*, 441*b*, 441*c*, 441*d*, 441*e*, 441*f*, . . . , 441*h*. The plurality of multiplexers 441*a*, 441*b*, 441*c*, 441*d*, 441*e*, 441*f*, . . . , 441*h* may include two input stages. One of two input stages is connected to the output of the scrambler 412 and the other one is connected to the symbol generator 420. Each of the plurality of multiplexers 441*a*, 441*b*, 441*c*, 441*d*, 441*e*, 441*f*, . . . , 441*h* may output the symbols ISa, ISb, ISc, ISd, ISe, ISf, ISh input from the scrambler 412 or the alternative symbol CS input from the symbol generator 420 according to the selection signal SEL output from the corresponding pattern detector among the plurality of pattern detectors 431*a*, 431*b*, 431*c*, 431*d*, 431*e*, 431*f*, . . . , 431*h*. The selector 440 may output sequence data in which at least one symbol of the input symbols ISa, ISb, ISc, ISd, ISe, ISf, ISh is replaced with the alternative symbol CS as the training pattern TP0.

Here, the scrambler 412, the detector 430, and the selector 440 may correspond to one data line DQ0. That is, the scrambler 412, the detector 430, and the selector 440 may be provided for each data line.

When the 3b-2 PAM3 encoder is used, which changes 3-bit data to the 2-bit symbol in order to output a 32-bit training pattern TP0 (in which the invalid symbol is removed from the sequence data SD0), eight 3b-2 PAM3 encoders are required per data line, and the 3b-2 PAM3 encoder has 12 gates between the input and the output, so the 3b-2 PAM3 encoder may have 96 gates per data line. In contrast, when the pattern generator 400 according to an embodiment is used, 16 pattern detectors per data line are required, and one pattern detector has three gates between the input and the output, so one pattern detector may have 48 gates per data line. Therefore, according to the pattern generator 400 according to an embodiment, overhead may be reduced when generating the training pattern constituted by the valid symbol.

FIG. 6 is a table showing a training pattern generated by the memory device according to an embodiment. When generating one training pattern, all input symbols (i.e., invalid symbols) to be replaced may be replaced with one alternative symbol. The alternative symbol value may be cyclically changed whenever the training pattern is generated. When a training pattern OUTPUT changed according to the alternative symbol is segmented into the 2-bit unit, the training pattern OUTPUT does not include the invalid symbol "10".

When a first training pattern is generated ($1^{st}$ burst), all "10" input symbols 601*a*, 601*b*, and 601*c* may be replaced with the alternative symbols CS "11". The selection signal SEL for the three input symbols 601*a*, 601*b*, and 601*c* may have the logic value "H". Alternatively or additionally, when a second training pattern is generated ($2^{nd}$ burst), all five "10" input symbols 602*a*, . . . , 602*e* may be replaced with the alternative symbols CS "01". The selection signal SEL for the input symbols 602*a*, . . . , 602*e* may have the logic value "H". Finally, when a third training pattern is generated ($3^{rd}$ burst), the single "10" input symbol 603*a* may be replaced with the alternative symbols CS "00". The selection signal SEL for the input symbols 603*a* may have the logic value "H".

The training pattern generated by the pattern generator (112 in FIG. 1) of the memory device (100 in FIG. 1) may be transmitted to the memory device (110 in FIG. 1) upon the read training or transmitted to the training module (294 in FIG. 2) upon the write training. Hereinafter, the operation of the training module upon the write training will be described with reference to FIG. 7.

Figure 7:
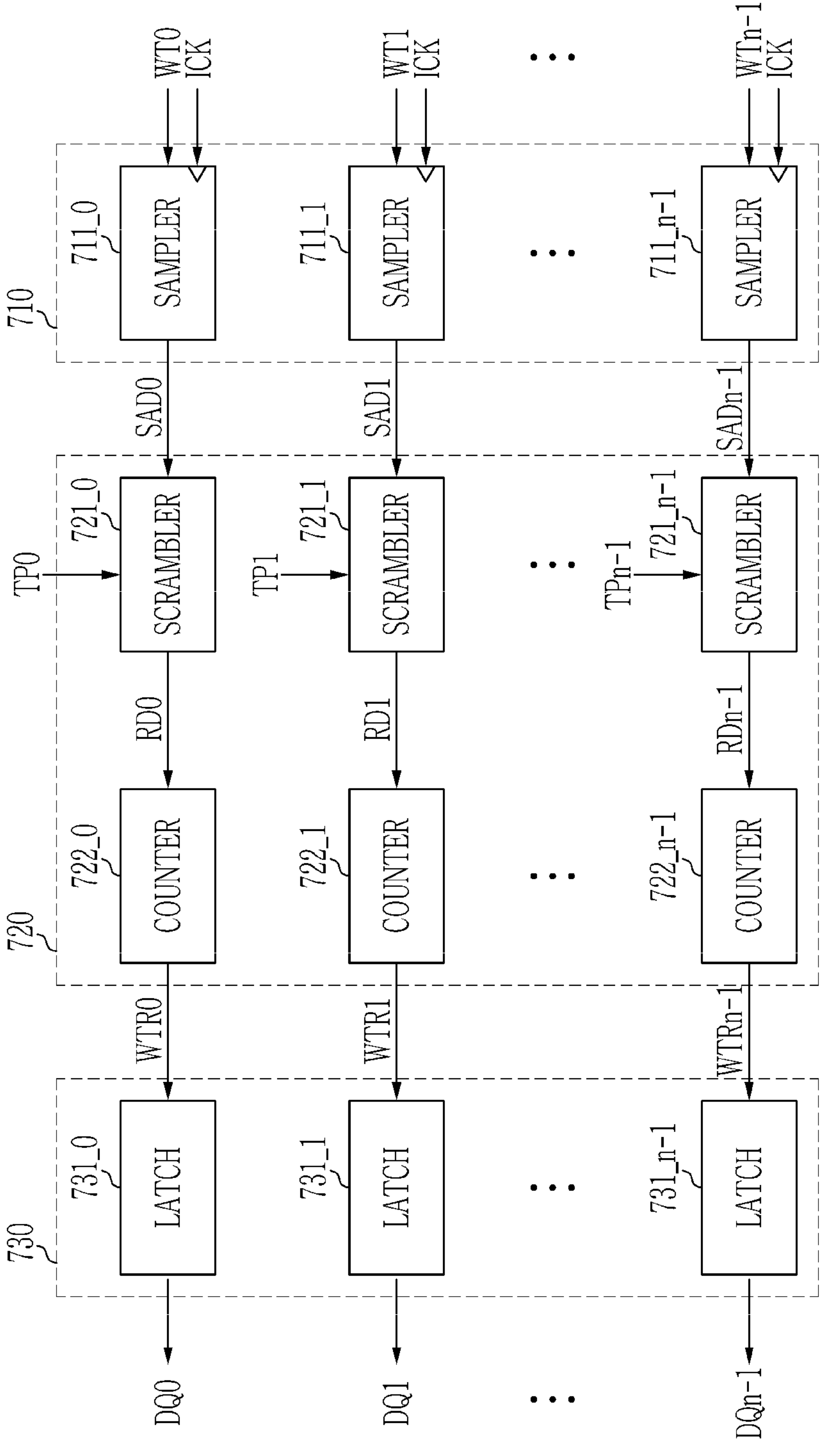
FIG. 7 is a block diagram illustrating a receiver, a training module, a first-in/first-out circuit of the memory device according to an embodiment.

FIG. 7 is a block diagram illustrating a receiver, a training module, and a first-in/first-out (FIFO) buffer circuit of the memory device according to an embodiment. Referring to FIG. 7, upon the write training, the receiver 710 may receive a plurality of input write training patterns WT0, WT1, WTn−1. The receiver 710 may include a plurality of samplers 711_0, 711_1, . . . , 711_*n*−1. The plurality of samplers 711_0, 711_1, . . . , 711_*n*−1 may receive the internal data clock ICK. The plurality of samplers 711_0, 711_1, . . . , 711_*n*−1 may output sampling data SAD0, SAD1, . . . , SADn−1 by sampling the plurality of write training patterns WT0, WT1, . . . , WTn−1, respectively by synchronizing with the internal data clock ICK.

The training module 720 may include a plurality of scramblers 721_0, 721_1, . . . , 721_*n*−1 and a plurality of counters 722_0, 722_1, . . . , 722_*n*−1. The plurality of scramblers 721_0, 721_1, . . . , 721_*n*−1 may output a plurality of result data RD0, RD1, . . . , RDn−1 by the XOR operation of the sampling data SAD0, SAD1, . . . , SADn−1 output by the plurality of samplers 711_0, 711_1, . . . , 711_*n*−1, and the plurality of training patterns TP0, TP1, . . . , TPn−1 output by the pattern generator (300 in FIG. 3) by the unit of the bits.

The plurality of counters 722_0, 722_1, . . . , 722_*n*−1 may count a value (e.g., a logic value "0") indicating that the sampling data SAD0, SAD1, . . . , SADn−1 and the training pattern TP0, TP1, . . . , TPn−1 do not match in the plurality of result data RD0, RD1, . . . , RDn−1. The plurality of counters 722_0, 722_1, . . . , 722_*n*−1 may output the number of logical values "0" within the plurality of result data RD0, RD1, . . . , RDn−1 as a plurality of counting result values WTR0, WTR1, WTRn−1.

The FIFO circuit 730 may include a plurality of latches 731_0, 732_1, . . . , 731_*n*−1. The plurality of latches 731_0, 732_1, . . . , 731_*n*−1 may receive and latch the plurality of counting result values WTR0, WTR1, . . . , WTRn−1 output from the plurality of counters 722_0, 722_1, . . . , 722_*n*−1. When the plurality of latches 731_0, 732_1, . . . , 731_*n*−1 receives the read training command from the memory controller (110 in FIG. 1), the plurality of latches 731_0, 732_1, . . . , 731_*n*−1 may output the plurality of counting result values WTR0, WTR1, . . . , WTRn−1 to the plurality of data lines DQ0, DQ1, . . . , DQn−1.

Upon the write training, each of the plurality of write training patterns WT0, WT1, . . . , WTn−1 may be generated based on the same seed value and option value OV as one corresponding training pattern among the plurality of training patterns TP0, TP1, . . . , TPn−1. The training module 720 may generate the counting result values WTR0, WTR1, . . . , WTRn−1 indicating whether the sampling data SAD0, SAD1, . . . , SADn−1 sampled by the receiver 710 and the plurality of training patterns TP0, TP1, . . . , TPn−1 match each other. When the counting result values WTR0, WTR1, WTRn−1 are transferred to the memory controller (120 in FIG. 1), the data I/O circuit 122 of the memory controller 120 may adjust the output timing of the data signal for each of the plurality of data lines DQ0, DQ1, . . . , DQn−1 based on the counting result values WTR0, WTR1, . . . , WTRn−1.

Figure 8:
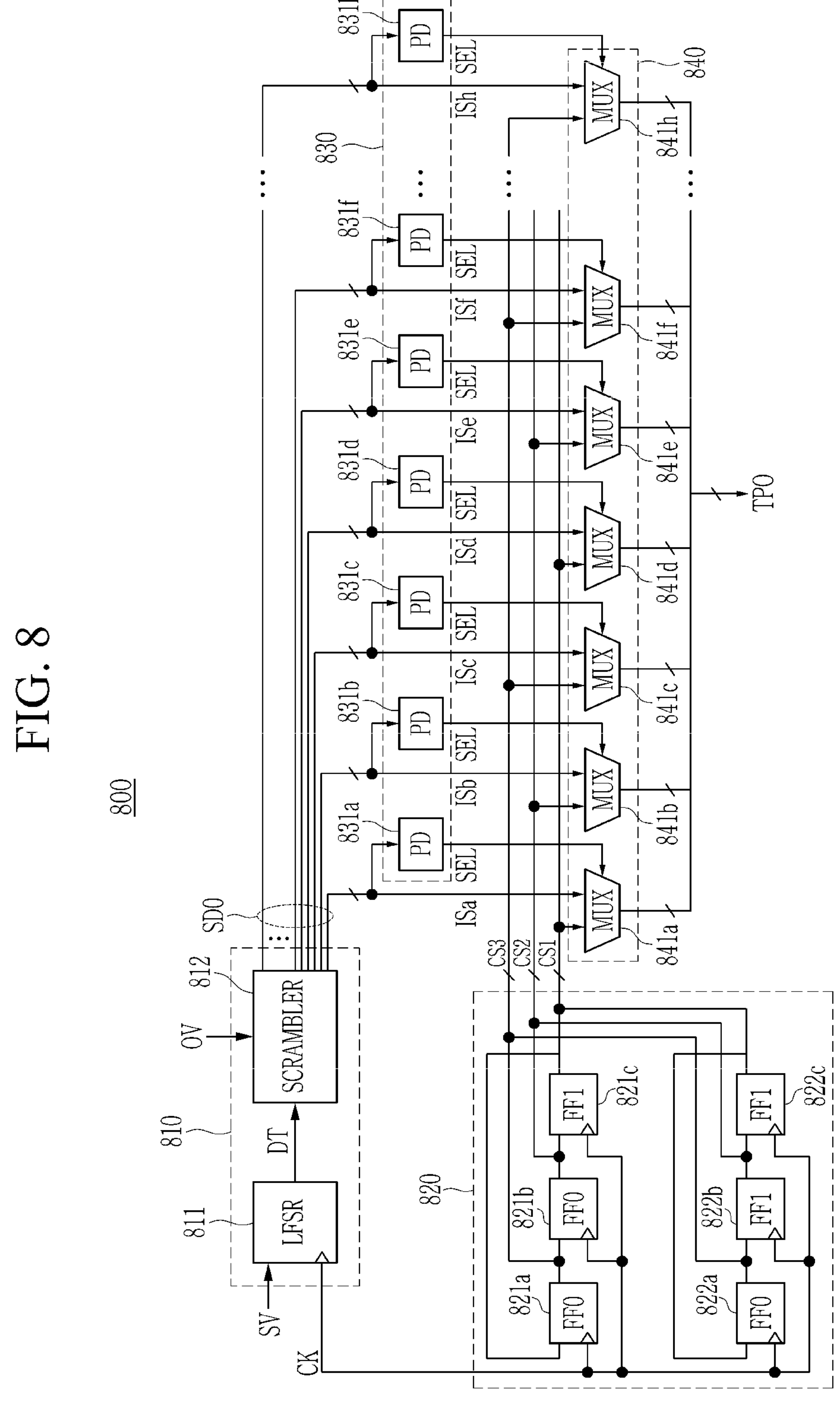
FIG. 8 is a block diagram specifically illustrating the pattern generator of the memory device according to an embodiment.

FIG. 8 is a block diagram specifically illustrating the pattern generator of the memory device according to an embodiment. Referring to FIG. 8, the pattern generator 800 may include a sequence data generator 810 (including PRBS sequence data generator 811 and scrambler 812), a symbol generator 820, a detector 830, and a selector 840. A description of the sequence data generator 810 and the detector 830 is the same as or similar to the description in FIG. 4, so the description is omitted.

The symbol generator 820 may generate a plurality of alternative symbols CS1, CS2, and CS3. Each of the plurality of alternative symbols CS1, CS2, and CS3 may be multi-bit data. In an embodiment, each of the plurality of alternative symbols CS1, CS2, and CS3 may be 2-bit data. The plurality of alternative symbols CS1, CS2, and CS3 may have different values. The symbol generator 820 may generate values of the plurality of alternative symbols CS1, CS2, and CS3 differently for each clock cycle. For example, the symbol generator 820 may sequentially generate "11", "01", and "00" as the value of the alternative symbol CS1 for each clock cycle.

The symbol generator 820 may sequentially generate "01", "00", and "11" as the value of the alternative symbol CS2 for each clock cycle. The symbol generator 820 may sequentially generate "00", "11", and "01" as the value of the alternative symbol CS3 for each clock cycle. The symbol generator 820 may be a cyclic shift register including a plurality of flipflops 821*a*, 821*b*, 821*c*, 822*a*, 822*b*, and 822*c*. The flipflops 821*a*, 821*b*, and 822*a* may output the logic value "0" by default, and the flipflops 821*c*, 822*b*, and 822*c* may output the logic value "1" by default. The symbol generator 820 may output outputs of the flipflops 821*c* and 822*c* as the alternative symbol CS1. The symbol generator 820 may output outputs of the flipflops 821*b* and 822*b* as the alternative symbol CS2. The symbol generator 820 may output outputs of the flipflops 821*a* and 822*a* as the alternative symbol CS3.

The selector 840 may output the training pattern TP0 by using the sequence data SD0 and the alternative symbols CS1, CS2, and CS3. The selector 840 may include a plurality of multiplexers 841*a*, 841*b*, 841*c*, 841*d*, 841*e*, 841*f*, . . . , 841*h*. The plurality of multiplexers 841*a*, 841*b*, 841*c*, 841*d*, 841*e*, 841*f*, . . . , 841*h* may include two input stages. One of two input stages is connected to the output of the scrambler 812 and the other one is connected to the symbol generator 820. In one or more embodiments, the plurality of multiplexers 841*a*, 841*b*, 841*c*, 841*d*, 841*e*, 841*f*, . . . , 841*h* may receive one corresponding alternative symbol among the alternative symbols CS1, CS2, and CS3. Multiplexers 841*a*, 841*d*, . . . of a first group among the plurality of multiplexers 841*a*, 841*b*, 841*c*, 841*d*, 841*e*, 841*f*, . . . , 841*h* may receive a first alternative symbol CS1 among the alternative symbols CS1, CS2, and CS3. Multiplexers 841*b*, 841*e*, . . . of a second group among the plurality of multiplexers 841*a*, 841*b*, 841*c*, 841*d*, 841*e*, 841*f*, . . . , 841*h* may receive a second alternative symbol CS2 among the alternative symbols CS1, CS2, and CS3. Multiplexers 841*c*, 841*f*, . . . , 841*h* of a third group among the plurality of multiplexers 841*a*, 841*b*, 841*c*, 841*d*, 841*e*, 841*f*, . . . , 841*h* may receive a third alternative symbol CS3 among the alternative symbols CS1, CS2, and CS3.

Each of the plurality of multiplexers 841*a*, 841*b*, 841*c*, 841*d*, 841*e*, 841*f*, . . . , 841*h* may output the symbols ISa, ISb, ISc, ISd, ISe, ISf, ISh input from the scrambler 812 or the alternative symbols CS1, CS2, and CS3 input from the symbol generator 820 according to the selection signal SEL output from the corresponding pattern detector among the plurality of pattern detectors 831*a*, 831*b*, 831*c*, 831*d*, 831*e*, 831*f*, . . . , 831*h*. The selector 840 may output sequence data in which at least one symbol of the input symbols ISa, ISb, ISc, ISd, ISe, ISf, ISh is replaced with one corresponding alternative symbol among the alternative symbols CS1, CS2, and CS3 as the pattern TP0.

FIG. 9 is a table showing a training pattern generated by the memory device according to an embodiment. As shown, when generating one training pattern, each of input symbols (i.e., invalid symbols) to be replaced may be replaced with one corresponding alternative symbol among the alternative symbols CS1, CS2, and CS3. Values of the respective alternative symbols CS1, CS2, and CS3 may be cyclically changed whenever the training pattern is generated. When a training pattern OUTPUT changed according to the alternative symbols CS1, CS2, and CS3 is segmented into the 2-bit unit, the training pattern OUTPUT does not include the invalid symbol "10".

When a first training pattern is generated ($1^{st}$ burst), input symbols 901*a* and 901*c* may be replaced with an alternative symbol CS1 "11" and a symbol 901*b* may be replaced with an alternative symbol CS3 "00". The selection signal SEL for the input symbols 901*a*, 901*b*, and 901*c* may have the logic value "H".

When a second training pattern is generated ($2^{nd}$ burst), input symbols 902*a* and 902*b* may be replaced with an alternative symbol CS2 "00", a symbol 902*c* may be replaced with an alternative symbol CS1 "01", and symbols 902*d* and 902*e* may be replaced with an alternative symbol CS3 "11". The selection signal SEL for the input symbols 902*a*, . . . , 902*e* may have the logic value "H". Finally, when a third training pattern is generated ($3^{rd}$ burst), the input symbol 903*a* may be replaced with the alternative symbol CS2 "11". The selection signal SEL for the input symbols 903*a* may have the logic value "H". According to an embodiment, since the invalid symbols may be selectively replaced with any one of the alternative symbols CS1, CS2, and CS3, a randomness of the training pattern may increase.

Figure 10:
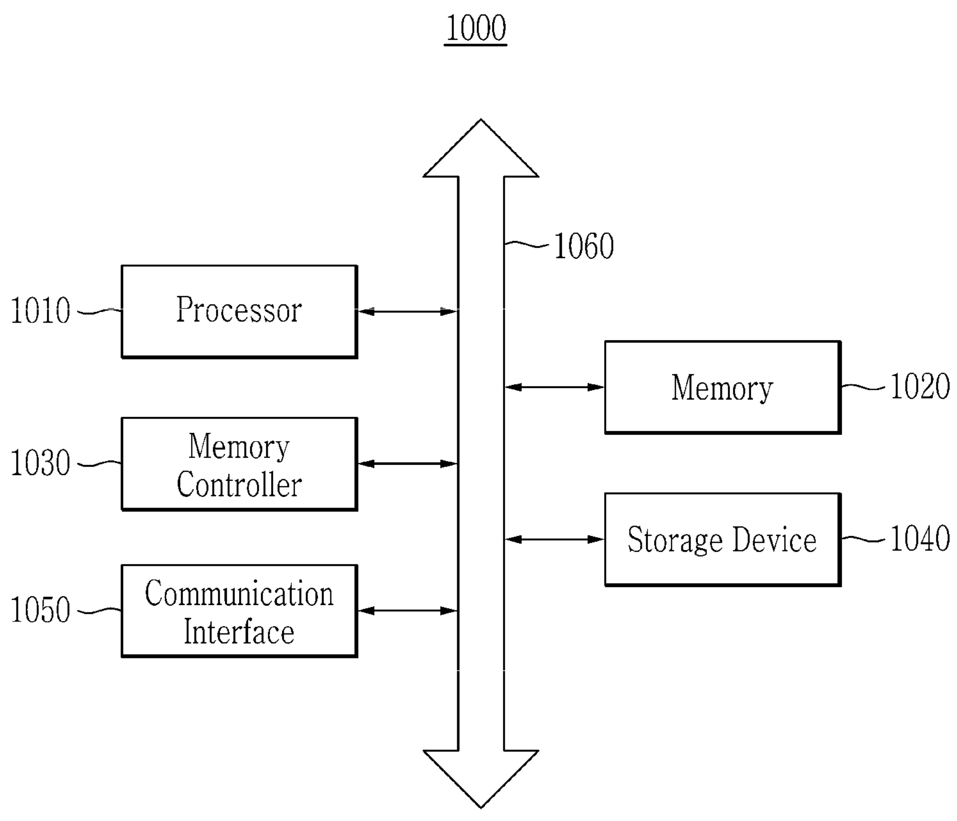
FIG. 10 is a block diagram illustrating a computer system according to an embodiment.

FIG. 10 is a block diagram illustrating a computer system according to an embodiment. Referring to FIG. 10, the computing system 1000 includes a processor 1010, a memory 1020, a memory controller 1030, a storage device 1040, a communication interface 1050, and a bus 1060. The processor 1010 controls an overall operation of each component of the computing system 1000. The processor 1010 may be implemented as at least one of various processing units including a central processing unit (CPU), an application processor (AP), a graphic processing unit (GPU), etc.

The memory 1020 stores various types of data and commands. The memory 1020 may be implemented as the memory device described with reference to FIGS. 1 to 9. The memory controller 1030 controls transfer data or command to and from the memory 1020. The memory controller 1030 may be implemented as the memory controller described with reference to FIGS. 1 to 9. In one or more embodiments, the memory controller 1030 may be provided as a separated chip from the processor 1010. In one or more embodiments, the memory controller 1030 may be provided as an internal component of the processor 1010. Each of the memory 1020 and the memory controller 1030 may generate a training pattern for performing data training. Each of the memory 1020 and the memory controller 1030 generates the alternative symbol according to FIGS. 1 to 9 to replace the invalid symbol included in the training pattern.

The storage device 1040 non-temporarily stores programs and data. In one or more embodiments, the storage device 1040 may be implemented as a non-volatile memory, however, other memory technologies for long term storage may also be used.

The communication interface 1050 supports wired/wireless Internet communication of the computing system 1000. Further, the communication interface 1050 may also support various communication schemes in addition to the internet communication. The bus 1060 provides a communication function between the components of the computing system 1000. The bus 1060 may include at least one type of bus according to a communication protocol between the components.

In one or more embodiments, each component or a combination of two or more components described with reference to FIGS. 1 to 9 may be implemented as a digital circuit, a logic device or array which is programmable or not programmable, an application specific integrated circuit (ASIC), etc. For example, one or more components such as "receiver", "scrambler", "pattern generator", "symbol changer", "sequence data generator", "selector" and "detector" may include circuitry or may be implemented as one or more circuits.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A semiconductor device, comprising:

a sequence data generator configured to generate sequence data;

a symbol changer configured to generate a training pattern from the sequence data by replacing each occurrence of a bitstream within the sequence data that has a predetermined symbol with an alternative symbol; and a driver configured to output the training pattern to an external semiconductor device, wherein the predetermined symbol corresponds to an invalid symbol for a modulation scheme of the driver.

2. The semiconductor device of claim 1, wherein the sequence data generator comprises:

a sequence generator configured to generate a pseudo random binary sequence (PRBS), based on a seed value for each clock cycle; and a scrambler configured to generate the sequence data by performing an XOR operation between an option value having a same number of bits as the PRBS, and the PRBS.

3. The semiconductor device of claim 2, wherein the symbol changer comprises:

a symbol generator configured to generate and output the alternative symbol for each clock cycle;

a detector configured to output a selection signal at a predetermined logic level in response to detecting each occurrence of the predetermined symbol within the sequence data; and a selector configured to replace each occurrence of the predetermined symbol within the sequence data with the alternative symbol, according to the predetermined logic level of the selection signal.

4. The semiconductor device of claim 3, wherein the symbol generator cyclically generates and outputs the alternative symbol as a different value for each of a plurality of clock cycles.

5. The semiconductor device of claim 4, wherein the symbol generator generates a plurality of alternative symbols including a first alternative symbol and a second alternative symbol having different values for each of the plurality of clock cycles; and wherein when a plurality of bitstreams are grouped into a plurality of groups including two or more bitstreams, the symbol changer uses the first alternative symbol as the alternative symbol in a first group among the plurality of groups, and uses the second alternative symbol as the alternative symbol in a second group among the plurality of groups.

6. The semiconductor device of claim 3, wherein:

the detector includes a plurality of pattern detectors which segment and receive the sequence data into a plurality of bit units, and outputs the selection signal at an enable level when a plurality of consecutive bitstreams received by a unit of the plurality of bit units is the same as the predetermined symbol; and wherein the selector includes a plurality of multiplexers, with each multiplexer including a first input stage which receives and segments the sequence data by the unit of the plurality of bit units, a second input stage into which the alternative symbol is input, and an output stage that outputs: (i) the plurality of consecutive bitstreams received by the unit of the plurality of bit units, or (ii) the alternative symbol, according to the enable level of the selection signal.

7. The semiconductor device of claim 1, further comprising:

a receiver configured to receive a plurality of external training patterns from the external semiconductor device; and a training module configured to generate a counting value indicating whether the plurality of external training patterns and a plurality of training patterns match each other; and wherein the driver outputs the counting value to the external semiconductor device.

8. The semiconductor device of claim 7, wherein:

the receiver includes a plurality of samplers for sampling the plurality of external training patterns based on a clock signal provided from the external semiconductor device.

9. The semiconductor device of claim 8, wherein the training module comprises:

a plurality of scramblers configured to output a plurality of result data by performing an XOR operation between a plurality of sampling data output by the plurality of samplers and the plurality of training patterns; and a plurality of counters configured to count a value indicating that the plurality of sampling data and the plurality of training patterns do not match each other, to generate the counting value in the plurality of result data.

10. A semiconductor device, comprising:

a sequence data generator configured to generate sequence data;

a symbol changer configured to generate a training pattern from the sequence data by replacing each occurrence of a bitstream within the sequence data that has a predetermined symbol with an alternative symbol, wherein the symbol changer comprises:

a symbol generator configured to generate and output the alternative symbol for each clock cycle;

a detector configured to output a selection signal at a predetermined logic level in response to detecting each occurrence of the predetermined symbol within the sequence data; and a selector configured to replace each occurrence of the predetermined symbol within the sequence data with the alternative symbol, according to the predetermined logic level of the selection signal; and a driver configured to output the training pattern to an external semiconductor device.

11. The semiconductor device of claim 10, wherein the sequence data generator comprises:

a sequence generator configured to generate a pseudo random binary sequence (PRBS), based on a seed value for each clock cycle; and a scrambler configured to generate the sequence data by performing an XOR operation between an option value having a same number of bits as the PRBS, and the PRBS.

12. The semiconductor device of claim 10, wherein the symbol generator cyclically generates and outputs the alternative symbol as a different value for each of a plurality of clock cycles.

13. The semiconductor device of claim 10, wherein the symbol generator generates a plurality of alternative symbols including a first alternative symbol and a second alternative symbol having different values for each of a plurality of clock cycles; and wherein when a plurality of bitstreams are grouped into a plurality of groups including two or more bitstreams, the symbol changer uses the first alternative symbol as the alternative symbol in a first group among the plurality of groups, and uses the second alternative symbol as the alternative symbol in a second group among the plurality of groups.

14. The semiconductor device of claim 10, wherein:

the detector includes a plurality of pattern detectors which segment and receive the sequence data into a plurality of bit units, and outputs the selection signal at an enable level when a plurality of consecutive bitstreams received by the unit of the plurality of bits is the same as the predetermined symbol; and wherein the selector includes a plurality of multiplexers, with each multiplexer including a first input stage which receives and segments the sequence data by the unit of the plurality of bits, a second input stage into which the alternative symbol is input, and an output stage that outputs: (i) the plurality of consecutive bitstreams received by the unit of the plurality of bits, or (ii) the alternative symbol, according to a level of the selection signal.

15. The semiconductor device of claim 10, further comprising:

a receiver configured to receive a plurality of external training patterns from the external semiconductor device; and a training module configured to generate a counting value indicating whether the plurality of external training patterns and a plurality of training patterns match each other; and wherein the driver outputs the counting value to the external semiconductor device.

16. The semiconductor device of claim 15, wherein:

the receiver includes a plurality of samplers for sampling the plurality of external training patterns based on a clock signal provided from the external semiconductor device.

17. The semiconductor device of claim 16, wherein the training module comprises:

a plurality of scramblers configured to output a plurality of result data by performing an XOR operation between a plurality of sampling data output by the plurality of samplers and the plurality of training patterns; and a plurality of counters configured to count a value indicating that the plurality of sampling data and the plurality of training patterns do not match each other, to generate the counting value in the plurality of result data.

18. A semiconductor device, comprising:

a sequence data generator configured to generate sequence data;

a symbol changer configured to generate a training pattern from the sequence data by replacing each occurrence of a bitstream within the sequence data that has a predetermined symbol with an alternative symbol, wherein the sequence data and the training pattern have a same number of bits;

a driver configured to output the training pattern to an external semiconductor device.

19. The semiconductor device of claim 18, further comprising:

a receiver configured to receive a plurality of external training patterns from the external semiconductor device; and a training module configured to generate a counting value indicating whether the plurality of external training patterns and a plurality of training patterns match each other; and wherein the driver outputs the counting value to the external semiconductor device.

* * * * *